UNITED STATES PATENT OFFICE.

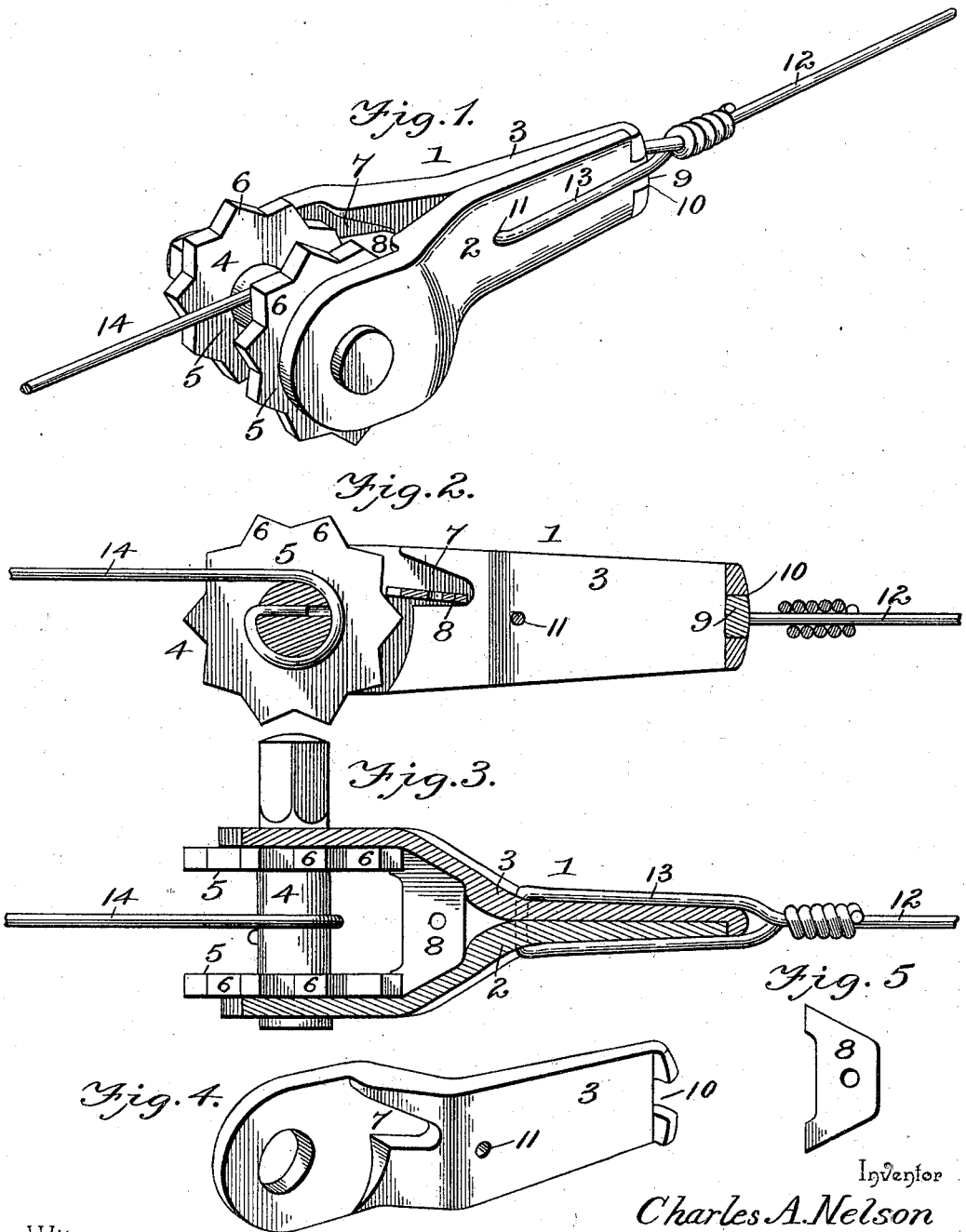

CHARLES ALLEN NELSON, OF ITHACA, MICHIGAN.

WIRE-STRETCHER.

SPECIFICATION forming part of Letters Patent No. 598,641, dated February 8, 1898.

Application filed May 13, 1897. Serial No. 636,325. (No model.)

*To all whom it may concern:*

Be it known that I, CHARLES ALLEN NELSON, a citizen of the United States, residing at Ithaca, in the county of Gratiot and State of Michigan, have invented a new and useful Wire-Stretcher, of which the following is a specification.

This invention relates to improvements in wire-stretchers.

The object of the present invention is to improve the construction of that class of wire-stretchers known as "mid-wire take-ups" and to provide a simple, inexpensive, and efficient one adapted to be readily connected to a fence-wire and capable of enabling the wires of a fence to be tightened in warm weather and loosened in cold weather to counteract the expansion and contraction of the wires and to prevent them from becoming loose in warm weather and breaking in cold weather.

The invention consists in the construction and novel combination and arrangement of parts, as hereinafter fully described, illustrated in the drawings, and pointed out in the claims hereto appended.

In the accompanying drawings, Figure 1 is a perspective view of a wire-stretcher constructed in accordance with this invention. Fig. 2 is a longitudinal sectional view. Fig. 3 is a horizontal sectional view. Fig. 4 is a detail perspective view of one of the sections of the frame. Fig. 5 is a detail view of the double pawl.

Like numerals of reference designate corresponding parts in the several figures of the drawings.

1 designates a substantially Y-shaped frame composed of sides 2 and 3, having their central portions diverged, as shown, to space their front portions, and the latter, which are arranged parallel with each other, are provided with bearing-openings and receive a reel 4, consisting of a shaft and a pair of annular flanges 5, forming the sides of the reel, and provided at their periphery with teeth 6. The sides of the reel are arranged between the spaced front portions of the sides of the frame, and one end of the shaft is extended and squared to receive a crank-handle or a suitable tool for rotating the reel to tighten or loosen a fence-wire.

The diverging portions of the sides of the frame are provided at their inner faces with recesses 7, receiving the ends of a transverse pawl 8, extending across the same and provided at its front edge with engaging portions to interlock with the teeth of the sides of the reel. The pawl, which is slightly tapering, is disposed at an inclination, and while permitting the forward rotation of the reel is adapted to lock the same against backward movement; but when it is desired to loosen a fence-wire the pawl is lifted out of engagement with the sides of the reel, and the latter is permitted to rotate backward.

The rear portions of the sides of the frame which lie flat against each other are interlocked, the side 2 being provided at its rear end with a transverse lug 9, and the side 3 is provided with a recess 10 for the reception of said lug. The frame is provided at the inner terminals of the contiguous portions with registering perforations 11, adapted to receive a fence-wire 12, which is passed through the perforations and twisted on itself to form a loop 13. The loop 13 embraces the rear portions of the sides of the frame and prevents the sides from separating.

The other portion 14 of the fence-wire is passed through a perforation of the shaft of the reel and is thereby connected with the latter, and by rotating the reel the fence-wire is stretched to the desired tension.

The wire-stretcher is adapted to be connected with a fence-wire at any point between two posts. Its parts are readily assembled, as the sides of the frame are separable, and the fence-wire is adapted to hold the parts together.

It will also be seen that the wire-stretcher will enable a fence-wire to be readily drawn to the desired tension and that it will permit an easy adjustment of the same to take up any slack in summer and to prevent breaking in winter.

What I claim is—

1. A wire-stretcher comprising a frame substantially Y-shaped composed of two separable sides having central diverging portions spacing the front portions of the sides and provided at their inner faces with recesses, said frame having the rear portions of its sides contiguous and provided with registering perforations, one side having at its rear end a notch, and the other side being provided with a lug fitting in the said notch, a reel journaled on the spaced front portions of the sides of the frame, arranged between the same and provided at the periphery of its sides with teeth, and a transverse pawl located between the sides of the frame, fitting in the said recesses and engaging the teeth of the reel, substantially as described.

2. In a wire-stretcher, the combination with a wire having a loop, of a frame composed of two separable sides interlocked at their rear ends and held in engagement by the loop of said wire, and a reel mounted between the sides of the frame at the front thereof, substantially as described.

3. A wire-stretcher comprising a substantially Y-shaped frame composed of two separable sides provided at their inner faces with recesses, a reel mounted between the sides of the frame and provided with a pair of annular flanges having ratchet-teeth and arranged contiguous to the inner faces of the sides, and a double pawl extending across the frame and having its ends loosely arranged in the recesses of the sides and being retained in position by the latter, said pawl being provided at its front with portions engaging the ratchet-flanges, substantially as described.

In testimony that I claim the foregoing as my own I have hereto affixed my signature in the presence of two witnesses.

CHARLES ALLEN NELSON.

Witnesses:
JNO. T. MATHEWS,
CHAS. A. SWEETMAN.